(12) United States Patent
Setoguchi (10) Patent No.: US 9,336,764 B2
(45) Date of Patent: May 10, 2016

(54) RECORDING AND PLAYBACK DEVICE, STORAGE MEDIUM, AND RECORDING AND PLAYBACK METHOD

(75) Inventor: Masaru Setoguchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 723 days.

(21) Appl. No.: 13/598,216

(22) Filed: Aug. 29, 2012

(65) Prior Publication Data

US 2013/0053993 A1   Feb. 28, 2013

(30) Foreign Application Priority Data

Aug. 30, 2011   (JP) .................................. 2011-187351

(51) Int. Cl.
| | |
|---|---|
| G06F 17/00 | (2006.01) |
| G10H 1/42 | (2006.01) |
| G06F 3/16 | (2006.01) |
| G11B 27/028 | (2006.01) |
| G10H 7/04 | (2006.01) |

(52) U.S. Cl.
CPC .. *G10H 1/42* (2013.01); *G06F 3/16* (2013.01); *G10H 7/04* (2013.01); *G11B 27/028* (2013.01); *G10H 2250/641* (2013.01)

(58) Field of Classification Search
None
See application file for complete search history.

(56) References Cited

U.S. PATENT DOCUMENTS

| | | | |
|---|---|---|---|
| 4,339,980 A | 7/1982 | Hooke et al. | |
| 5,973,255 A | 10/1999 | Tanji | |
| 7,105,735 B2 | 9/2006 | Senoo et al. | |
| 7,750,224 B1 | 7/2010 | Rav-Niv et al. | |
| 8,338,686 B2 | 12/2012 | Mann et al. | |
| 8,492,634 B2 | 7/2013 | Savo et al. | |
| 8,772,618 B2 | 7/2014 | Matsumoto | |
| 2003/0171933 A1 | 9/2003 | Perille | |
| 2004/0200336 A1 | 10/2004 | Senoo et al. | |
| 2005/0108357 A1 | 5/2005 | Sano | |
| 2006/0225561 A1 | 10/2006 | Kobayashi et al. | |
| 2007/0282467 A1 | 12/2007 | Rodrigues et al. | |
| 2008/0190271 A1 | 8/2008 | Taub et al. | |

(Continued)

FOREIGN PATENT DOCUMENTS

| | | |
|---|---|---|
| CN | 102568452 A | 7/2012 |
| JP | 06-175663 | 6/1994 |

(Continued)

OTHER PUBLICATIONS

Zoom Corporation, G2Nu Operation Manual, Apr. 2011, Zoom Corporation, http://web.archive.org/web/20110413061014/http://zoom.co.jp/products/g2nu/downloads/, pp. 4, 13-15, 32, 50.*

(Continued)

*Primary Examiner* — Fan Tsang
*Assistant Examiner* — David Siegel
(74) *Attorney, Agent, or Firm* — Holtz, Holtz & Volek PC (57) ABSTRACT

A recording and playback device according to the present invention stores in a memory section sound data for an amount of time corresponding to a beat which is acquired from an external source, and creates loop sound data in bar units by connecting a plurality of stored sound data. Then, the recording and playback device performs an operation to overlap newly acquired sound data onto the loop sound data while the loop sound data is being repeatedly replayed, and store the overlapping sound data in the memory section.

9 Claims, 6 Drawing Sheets

(56) References Cited

U.S. PATENT DOCUMENTS

| | | |
|---|---|---|
| 2008/0250914 A1 | 10/2008 | Reinhart et al. |
| 2008/0271592 A1 | 11/2008 | Beckford |
| 2009/0216354 A1 | 8/2009 | Ong et al. |
| 2010/0305732 A1 | 12/2010 | Serletic |
| 2010/0307321 A1 | 12/2010 | Mann et al. |
| 2010/0319517 A1 | 12/2010 | Savo et al. |
| 2010/0322042 A1 | 12/2010 | Serletic et al. |
| 2011/0011243 A1 | 1/2011 | Homburg |
| 2011/0011245 A1 | 1/2011 | Adam et al. |
| 2011/0011246 A1 | 1/2011 | Buskies et al. |
| 2011/0015767 A1 | 1/2011 | Homburg et al. |
| 2011/0041672 A1 | 2/2011 | Chan et al. |
| 2011/0175915 A1 | 7/2011 | Gehring |
| 2011/0247479 A1 | 10/2011 | Helms et al. |
| 2011/0247480 A1 | 10/2011 | Gehring et al. |
| 2011/0259176 A1 | 10/2011 | Pillhofer et al. |
| 2011/0307084 A1 | 12/2011 | Gehring et al. |
| 2012/0050176 A1 | 3/2012 | Chin |
| 2012/0097014 A1 | 4/2012 | Matsumoto |
| 2012/0220187 A1 | 8/2012 | Hillis et al. |
| 2012/0255424 A1 | 10/2012 | Matsumoto |
| 2013/0182856 A1 | 7/2013 | Setoguchi |
| 2013/0220102 A1 | 8/2013 | Savo et al. |
| 2013/0305906 A1 | 11/2013 | Kinter |
| 2014/0053711 A1 | 2/2014 | Serletic et al. |
| 2014/0140536 A1 | 5/2014 | Serletic et al. |
| 2014/0251116 A1 | 9/2014 | Peterson |
| 2014/0254834 A1 | 9/2014 | Umeo |
| 2014/0270263 A1 | 9/2014 | Fejzo et al. |
| 2014/0301573 A1 | 10/2014 | Kiely et al. |

FOREIGN PATENT DOCUMENTS

| | | | |
|---|---|---|---|
| JP | 06175663 A * | 6/1994 | ........... G11B 27/034 |
| JP | 2011-112679 | 6/2011 | |
| WO | 2010141504 A1 | 12/2010 | |
| WO | WO 2010/141504 A1 * | 12/2010 | ............... G10H 7/00 |

OTHER PUBLICATIONS

PDF of the screen capture from web.archive.org to show the Zoom G2Nu Operation manual available to public Apr. 11, 2011.*

Zoom Corporation, G2Nu Operation Manual, Apr. 2011, Zoom Corporation, http://web.archive.org/web/20110413061014/http://zoom.co.jp/products/g2nu/downloads/, pp. 4, 13-15, 32, 50, with PDF of the screen capture from web.archive.org to show the Zoom G2Nu Operation manual available to public Apr. 11, 2011.*

Japanese Office Action dated Jul. 26, 2013 (and English translation thereof) in counterpart Japanese Application No. 2011-187351.

Zoom Corporation; G2Nu/G2.1Nu Operation Manual; retrieved on Jul. 23, 2013 [online]; URL: http://web.archive.org/web/20110828222409/http://www.zoom.co.jp/download/J_G2Nu_G21Nu.pdf.

Chinese Office Action dated Nov. 3, 2014, issued in counterpart Chinese Application No. 201210315441.1.

Related U.S. Appl. No. 13/714,962; First Named Inventor: Masaru Setoguchi; Title: "Recording and Playback Device Capable of Repeated Playback, Computer-Readable Storage Medium, and Recording and Playback Method", filed Dec. 14, 2012.

Extended European Search Report dated Jan. 4, 2016, issued in counterpart European Application No. 12182282.9.

"Kaoss Pad KP3 Dynamic Effect/Sampler, Owners Manuel", Jan. 1, 2006, pp. 4-27, XP055235724, URL: http://.korg.com/uploads/Support/KP3_OM_EFG1_633659261667720000.pdf.

"Korg Kaoss Pad 3", Reviews: Effects, Feb. 1, 2007, XP055235767, URL: http://www.soundonsound.com/sos/feb07/articles/korgkaosspad3.htm.

* cited by examiner

RECORDING AND PLAYBACK DEVICE, STORAGE MEDIUM, AND RECORDING AND PLAYBACK METHOD

CROSS-REFERENCE TO RELATED APPLICATION

This application is based upon and claims the benefit of priority from the prior Japanese Patent Application No. 2011-137391, filed Aug. 30, 2011, the entire contents of which is incorporated herein by reference.

BACKGROUND OF THE INVENTION

1. Field of the Invention

The present invention relates to a recording and playback device and a program that, while repeatedly replaying a material recorded over a certain period of time, overdubs new material onto the material being repeatedly replayed.

2. Description of the Related Art

A technology is known which, while repeatedly replaying a material recorded over a certain period of time, overdubs new material onto the material being repeatedly replayed (loop sound data). As this type of technology, Japanese Patent Application Laid-open (Kokai) Publication No, 2011-112679 discloses an automatic musical performance device that repeatedly replays an event-recorded layer in a recording area composed of a plurality of layers (tracks), and performs overdubbing to record an event generated in response to a musical performance operation on a layer newly designated during the repeat p playback, whereby a musical accompaniment pattern to which musical modifications desired by the user have been made can be created through a process of extemporaneous trial and error.

The above-described technology disclosed in Japanese Patent Application Laid-open (Kokai) Publication No. 2011-112679, material is aimed at musical instrument digital interface (MIDI) events as material to record in response to musical performance operations. However, in recent years, a recording and playback device referred to as a so-called looper (loop sampler) has been put to practical use, which records sampled audio data, musical sound data generated by a sound source, or the like over a certain period of time, successively overdubs new material while repeatedly replaying the recorded material, and thereby creates a musical composition.

Material that is initially recorded in this looper is, for example, a sound that is emitted at each heat of a bar. While this recorded material is being repeatedly replayed, new material is successively overdubbed. The reason for initially recording the sound that keeps the beat is that this sound can be used as an indicator sound for indicating the beats of the bars and whereby the tempo can be more easily kept when new material is subsequently recorded.

However, although the time required to play one bar is short, it is difficult for an inexperienced player to accurately keep the beats of the bar. If timings at which sounds keep the beats fluctuate and become faster or slower than the intended beats, new material is overdubbed at these fluctuating timings, resulting in an unstable and poor-quality musical composition.

Also, in the conventional looper, the amount of time elapsed from when recording is started by the operation of a recording switch to when the recording is ended is considered as one bar, and this recorded data for one bar is used as loop sound data.

However, it is difficult to operate the recording switch such that the amount of time considered as one bar accurately coincides with the regular amount of time for one bar defined by meter and tempo.

Accordingly, there is a problem in the conventional looper in that high-quality loop data having a stable rhythm cannot be created.

The present invention has been conceived in light of the above-described problems, and an object of the present invention is to provide a recording and playback device and a program capable of creating accurate loop sound data by relatively simple operations.

SUMMARY OF THE INVENTION

In order to achieve the above-described object, in accordance with one aspect of the present invention, there is provided a recording and playback device comprising: a storage control section which stores in a memory section sound data for an amount of time corresponding to a beat among sound data acquired from an external source; a loop sound data creating section which creates loop sound data in bar units by connecting a plurality of sound data stored by the storage control section, and stores the loop sound data in the memory section; a repeat playback section which repeatedly replays the loop sound data stored in the memory section; and an overdubbing section which performs an operation to overlap sound data acquired during replaying of the loop sound data onto the loop sound data being replayed, and stores the overlapping sound data in the memory section.

In accordance with another aspect of the present invention, there is provided a non-transitory computer-readable storage medium having stored thereon a program that is executable by a computer used in a musical sound playback device, the program being executable by the computer to perform functions comprising: storage control processing for storing in a memory section sound data for an amount of time corresponding to a beat among sound data acquired from an external source; loop sound data creation processing for creating loop sound data in bar units by connecting a plurality of stored sound data, and storing the loop sound data in the memory section; repeat playback processing for repeatedly replaying the loop sound data stored in the memory section; and overdubbing processing for performing an operation to overlap sound data acquired during replaying of the loop sound data onto the loop sound data being replayed, and storing the overlapping sound data in the memory section.

In accordance with another aspect of the present invention, there is provided a musical sound playback method comprising an initial storing step of storing in a memory section sound data for an amount of time corresponding to a beat among sound data acquired from an external source; a loop sound data creating step of creating loop sound data in bar units by connecting a plurality of stored sound data, and storing the loop sound data in the memory section; a repeat playback step of repeatedly replaying the loop sound data stored in the memory section; and an overdubbing step of performing an operation to overlap sound data acquired during replaying of the loop sound data onto the loop sound data being replayed, and storing the overlapping sound data in the memory section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described with reference to the drawings.

A. Structure

Figure 1:
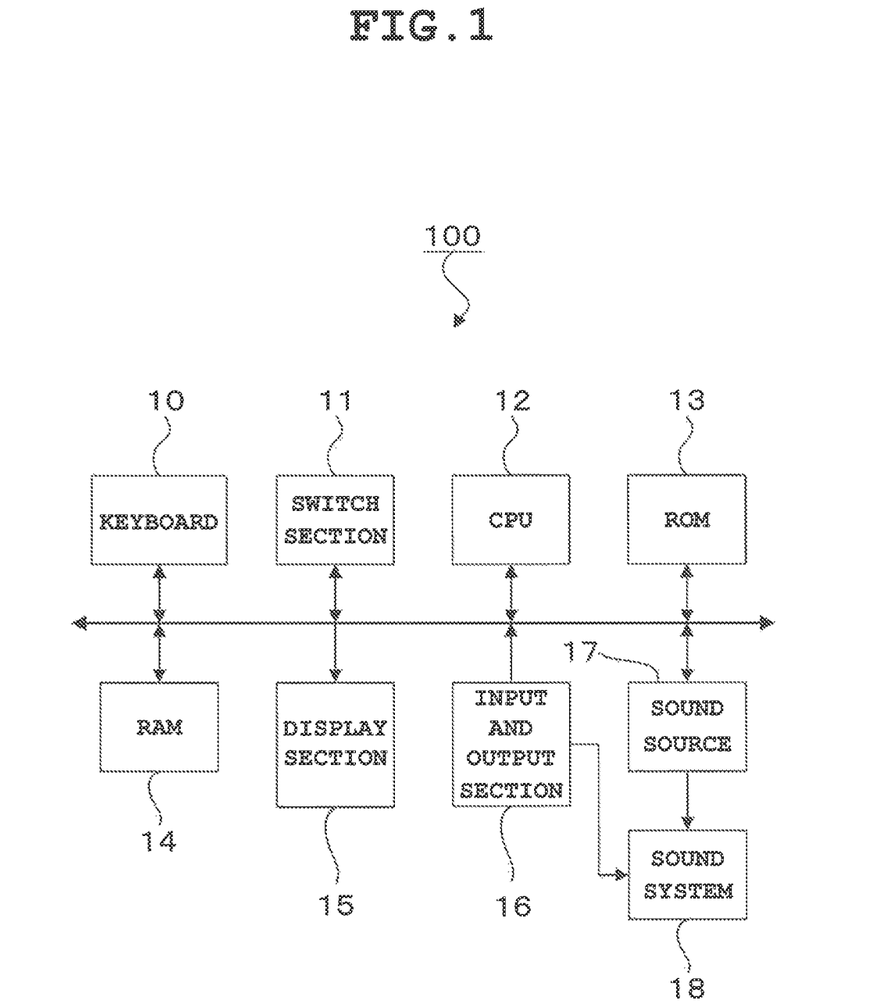
FIG. 1 is a block diagram showing the overall structure of an electronic musical instrument 100 including a recording and playback device according to an embodiment.

FIG. 1 is a block diagram showing the overall structure of an electronic musical instrument 100 including a recording and playback device (looper function) according to an embodiment of the present invention. A keyboard 10 in FIG. 1 generates musical performance information, such as a key-ON/key-OFF signal, a key number, and velocity, in response to a musical performance operation (key depression and release operation). A switch section 11 of FIG. 1 has various operating switches arranged on a device panel, and generates a switch event corresponding to the type of an operated switch. As operating switches related to the scope of the present invention, operating switches used to set "tempo (beats-per-minute [BNP] value)", "meter", and "expanded number of bars (described later)" serving as operating parameters in initial recording processing described hereafter, and operating switches of the recording and playback device (looper function) are included.

Figure 2:
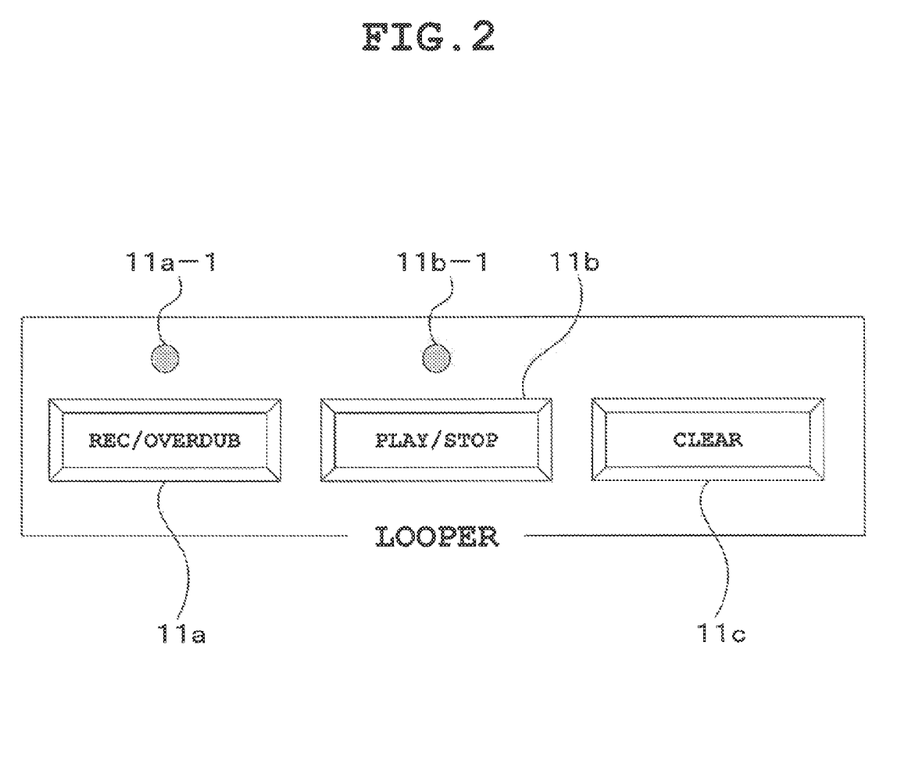
FIG. 2 is a diagram showing an example of the structure of operating switches related to the recording and playback device.

Here, an example of the operating switches related to the recording and playback device (looper function) will be described with reference to FIG. 2. In FIG. 2, a REC/OVERDUB switch 11e, a PLAY/STOP switch 11b, and a CLEAR switch 11c are shown. The REC/OVERDUB switch 11a generates an event EV_RECORD for giving an instruction to start or stop recording or overdubbing based on a depression operation. Near the REC/OVERDUB switch 11e there is provided a red light-emitting diode (LED) 11a-1 that flashes in a recording standby state and is lit in a recording state.

The PLAY/STOP switch 11b generates an event EV_PLAY for giving an instruction to start or stop playback based on a depression operation. Near the PLAY/STOP switch 11b there is provided a blue LED 11b-1 that is lit in a playback state. During overdubbing in which recording is performed while playback is being performed, the red LED 11a-1 and the blue LED 11b-1 are both lit. The CLEAR switch 11c generates an event EV_CLEAR for giving an instruction to delete recorded loop data based on a depression operation.

A central processing unit (CPU) 12 in FIG. 1 controls each section of the device based on switch events generated by the switch section 11. The details of the characteristic processing operations of the CPU 12 related to the scope of the present invention will be described later. A read-only memory (ROM) 13 of FIG. 1 stores the data of various programs to be loaded into the CPU 12. The various programs herein include the initial recording processing described later.

Figure 3:
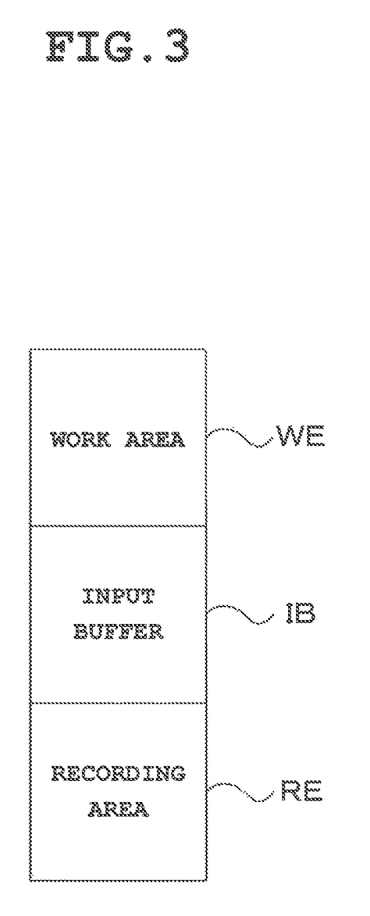
FIG. 3 is a memory map showing a memory configuration of a RAM 14.

A random access memory (RAM) 14 in FIG. 1 includes a work area WE, an input buffer IB, and a recording area RE, as shown in FIG. 3. The work area WE of the RAM 14 temporarily stores various register and flag data that are used for processing by the CPU 12. The input buffer IB of the RAM 14 temporarily stores audio data that is loaded via an input and output section 16 described later, or musical sound data that is outputted from a sound source 17, under the control of the CPU 12. In the recording area RE of the RAM 14, there is formed a loop data track (not shown) which stores loop data created by a plurality of sound data for an amount of time corresponding to a beat being connected to form sound data for an amount of time corresponding to one bar. This loop data track has a plurality of recording tracks so as to enable writing to be performed during read-out. During recording, audio data read out from the input buffer IB is overlapped with the loop data track and recorded in a recording track. Then, during playback, this audio data of the recording track is repeatedly read out.

A display section 15 in FIG. 1 displays on a screen the operating status, the setting status, and the like of the device based on display control signals supplied from the CPU 12. The input and output section 16 has an analog-to-digital (A/D) converter, and, for example, stores audio data acquired by sampling audio signals inputted from a microphone (not shown) in the input buffer IB of the RAM 14, or outputs audio data read out by time-sharing from each recorded track in the recording area RE of the RAM 14 to a sound system 18, under the control of the CPU 12.

The sound source 17 is configured by a known waveform memory readout system. This sound source 17 generates musical sound data based on a musical, sound command (note event) generated by the CPU 12 in accordance with play information supplied from the keyboard 10, or generates rhythmic sound data in accordance with a user-designated rhythm pattern. The sound system 18 performs the digital-to-analog (D/A) conversion of musical sound data outputted from the sound source 17 or audio data outputted from the input and output section 16, and after performing filtering on the converted data to remove unwanted noise and the like, amplifies its level, and emits the sound from a speaker.

B. Operations

Next, operations of the recording and playback device (looper function) included in the electronic musical instrument 100 structured as described above will be described. In the descriptions below, first, operations of the recording and playback device are outlined with reference to FIG. 4, and then the operations of the initial recording processing are described with reference to FIG. 5 to FIG. 6D.

(1) Overview of Operations of the Recording and Playback Device

Figure 4:
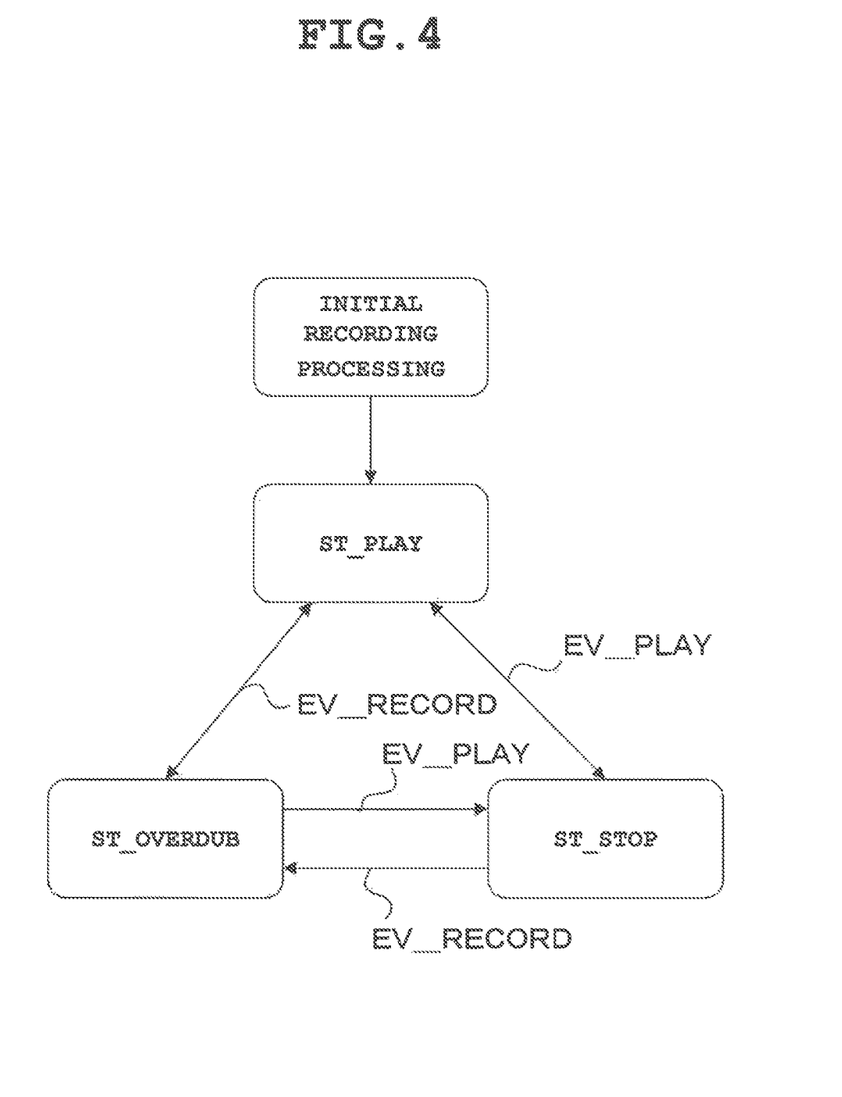
FIG. 4 is a state transition diagram outlining operations of the recording and playback device.

FIG. 4 is a state transition diagram outlining operations of the recording and playback device. In the initial recording processing of FIG. 4, a rhythm guide sound for keeping tempo is initially recorded to create loop data, in an unrecorded state (initial state) in which no sound has been recorded. Note that the specific operations of the initial recording processing will be described later. After the initial recording is performed and the loop data is created by the initial recording processing, the state transitions to a playback state ST_PLAY. In the playback state ST_PLAY, the recorded material is repeatedly replayed.

When the PLAY/STOP switch 11b is operated and pressed in the playback state ST_PLAY and the event EV_PLAY is generated thereby, the state transitions to a stop state ST_STOP where the repeat playback is stopped. When the PLAY/STOP switch 11b is operated and pressed in the stop state ST_STOP and the event EV_PLAY is generated thereby, the state returns to the playback state ST_PLAY where the recorded material is repeatedly replayed.

When the REC/OVERDUB switch 11a is operated and pressed in the playback state ST_PLAY and the event EV_RECORD is generated thereby, the state transitions to an overdubbing state ST_OVERDUB where a new material is overdubbed onto the recorded material while the recorded material is being repeatedly replayed. When the REC/OVERDUB switch 11a is operated and pressed in the overdubbing state ST_OVERDUB and the event EV_RECORD is generated thereby, the state returns to the playback state ST_PLAY where the recorded material is repeatedly replayed.

When the PLAY/STOP switch bib is operated and pressed in the overdubbing state ST_OVERDUB and the event EV_PLAY is generated thereby, the state transitions to the stop state ST_STOP where the repeat playback and the overdubbing are stopped. When the REC/OVERDUB switch 11a is pressed and operated in the stop state ST_STOP and the event EV_RECORD is generated thereby, the state transitions to the overdubbing state ST_OVERDUB where a new material is overdubbed onto the recorded material while the recorded material is being repeatedly replayed.

(2) Operations of Initial Recording Processing

Figure 5:
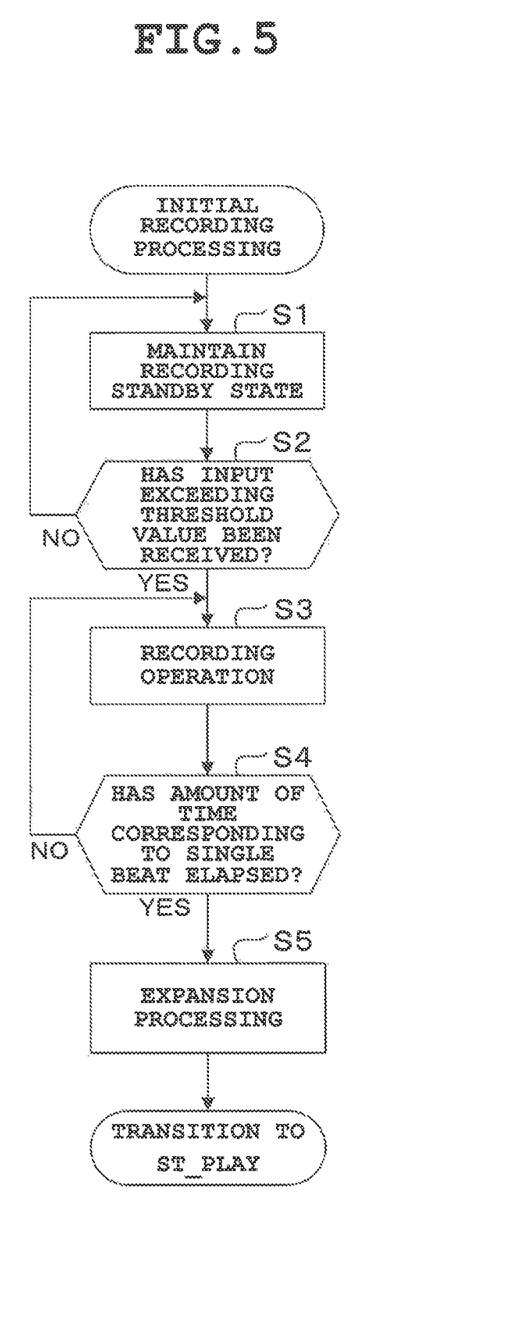
FIG. 5 is a flowchart of the operations of initial recording processing.

Next, the operations of the initial recording processing will be described with reference to FIG. 5. The initial recording processing is performed when the REC/OVERDUB switch 11a is operated and pressed in the unrecorded state (initial state) where no sound has been recorded in the recording area RE of the RAM 14. When the initial recording processing is performed, the CPU 12 initializes the input buffer IB of the RAM 14 and maintains a recording standby state until input data exceeding a threshold value is supplied, at Steps S1 to S2 in FIG. 5. Note that the input data herein refers to data to be recorded. Specifically, this data is audio data sampled via the input and output section 16 or musical sound data outputted from the sound source 17, which is selected by user operation.

When input data exceeding the threshold value is supplied, the judgment result at Step S2 is "YES", and therefore the CPU 12 proceeds to Step S3 and starts a recording operation to store the input data in the input buffer IB of the RAM 14. Note that the input data to be recorded is a sound that is easily audible as a rhythm guide sound for keeping tempo. This sound is preferably the sound of a bass drum or a bass, or a click sound, but is not limited thereto and may be a hand clapping sound or a tapping sound.

Next, at Step S4, the CPU 12 judges whether or not an amount of time corresponding to a single beat has elapsed from the start of the recording. Note that the amount of time corresponding to a single beat herein is an amount of time determined based on tempo (BPM value) and meter set in advance by user operation. When judged that an amount of time corresponding to a single beat has not elapsed from the start of the recording, the judgment result at Step S4 is "NO", and therefore the CPU 12 continues the recording operation at Step S3.

When judged that an amount of time corresponding to a single beat has elapsed from the start of the recording, the judgment result at Step S4 is "YES", and therefore the CPU 12 proceeds to Step S5. At Step S5, the CPU 12 performs expansion processing to copy input data recorded for the amount of time corresponding to a single beat, or in other words, input data for a single beat stored in the input buffer IB of the RAM 14 to the loop data track in the recording area RE of the RAM 14 until an expanded number of bars set in advance by user operation is reached.

Figure 6A:
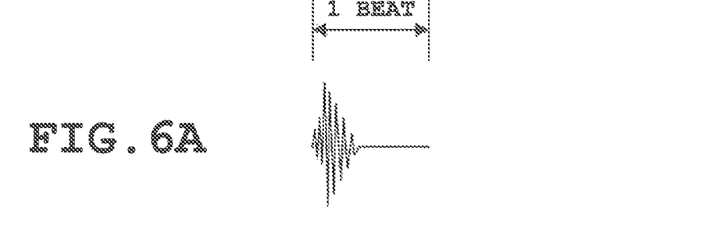
FIG. 6A, FIG. 6B, FIG. 6C and FIG. 6D are diagrams for describing the operations of the initial recording processing.

Next, the expansion processing will be described in detail with reference to FIG. 6. When, for example, input data for a single beat shown in FIG. 6A is recorded at above-described Step S3 to Step S4, if the tempo set in advance by user operation is "120 (BMP)" and the meter is 4/4 time, the amount of time corresponding to the single beat is "0.5 seconds". Here, if the expanded number of bars set in advance by user operation is "1", the input data for the single beat of "0.5 seconds" which has been stored in the input buffer IB of the RAM 14 is copied, and pasted four times in the loop data track in the recording area RE of the RAM 14 such that the copied data are connected.

Figure 6B:
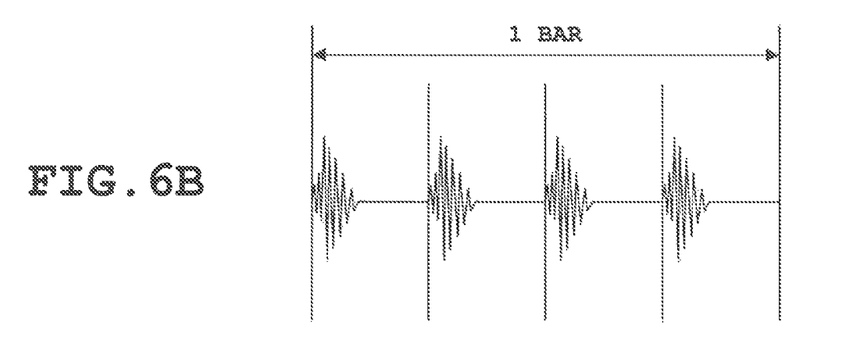
Figure 6C:
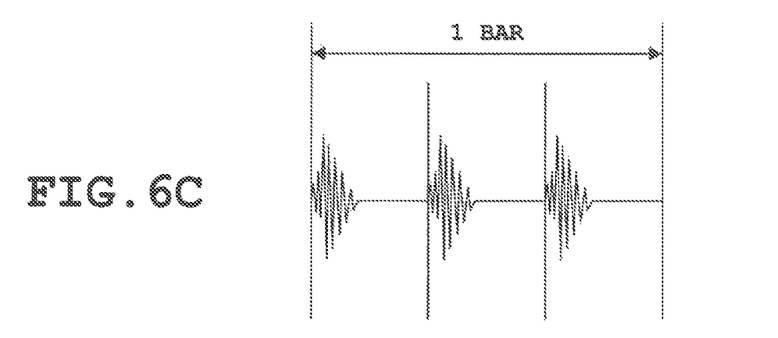
Figure 6D:
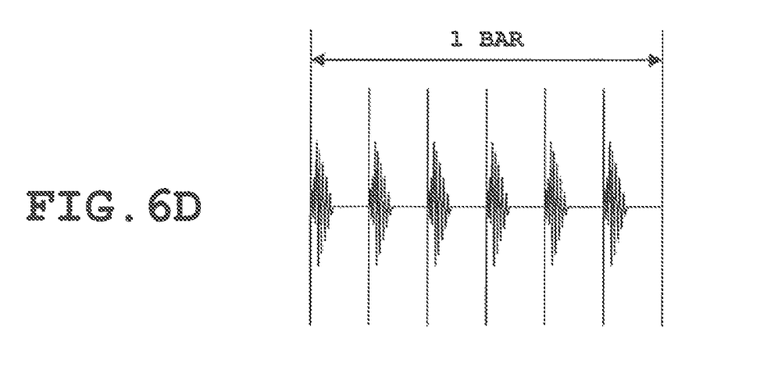

When the input data from the input buffer IB is to be pasted in the recording track, a writing pointer is addressed such that the end of input data written in the recording track first overlaps with the head of input data written in the recording track next which corresponds to the head of the beat, in order to ensure that the copied input data are not discontinuous. As a result, loop data in which the input data has been expanded to correspond to a bar is created as shown in FIG. 6B. When the tempo is "120 (BMP)" and the meter is ¾ time, if the expanded number of bars set in advance is "1", loop data shown in FIG. 6C is formed. Moreover, when the tempo is "120 (BPM)" and the meter is ⅝ time, if the expanded number of bars set in advance is "1", loop data shown in FIG. 6D is formed.

When the rhythm guide sound for keeping tempo is initially recorded in the unrecorded state (initial state) where no sound has been recorded, and loop data is created thereby, the state transitions to the above-described playback state ST_PLAY and the loop data is repeatedly replayed. Subsequently, when the REC/OVERDUB switch 11a is operated and pressed in the playback state ST_PLAY and the event EV_RECORD is generated thereby, the state transitions to the overdubbing state ST_OVERDUB where new audio data (or music data) is overdubbed onto the loop data while the loop data is being repeatedly replayed.

As described above, in the present embodiment, when input data exceeding a threshold value is supplied after the REC/OVERDUE switch 11a is operated and pressed in an unrecorded state (initial state) where no sound has been recorded in the recording area RE of the RAM 14, input data for an amount of time corresponding to a single beat is recorded in the input buffer IB of the RAM 14, and after loop data is created in which the input data has been copied by a number of times equal to the number of bars specified by the user and expanded in the loop data track in the recording area RE of the RAM 14, the loop data created in the loop data track is repeatedly replayed. Therefore, high-quality loop data that keeps accurate tempo can be created. In addition, unlike the conventional looper, a recording end switch is no longer required to be pressed at the end of recording. Accordingly, the usability is improved.

In the above-described embodiment, input data for an amount of time corresponding to a single beat is recorded, and loop data is created in which the input data has been copied by a number of times equal to the number of bars specified by the user and expanded. However, the present invention is not limited thereto, and a configuration may be adopted in which, in the case of a predetermined meter, input data for an amount of time corresponding to a half-beat is recorded, and loop data is created in which the input data has been copied by a number of times equal to the number of bars specified by the user and expanded.

In addition, in the present embodiment, the sound volume of input data for an amount of time corresponding to a single beat is expanded as is. However, the present invention is not limited thereto, and a configuration may be adopted in which sound volume control to increase or decrease the sound volume of a certain beat is performed, whereby accents are added to the rhythm of created loop data, and the loop data becomes more preferable as a rhythm guide sound for keeping tempo.

While the present invention has been described with reference to the preferred embodiments, it is intended that the invention be not limited by any of the details of the description therein but includes all the embodiments which fall within the scope of the appended claims.

What is claimed is:

1. A recording and playback device comprising:
   a memory; and
   a controller which is configured to:
      store in the memory first sound data having a length corresponding to a beat among sound data acquired from an external source;
      create a plurality of pieces of copied sound data from the first sound data, such that a number of the created pieces of the copied sound data is based on a specified meter, connect one of the plurality of pieces of copied sound data to another of the plurality of pieces of copied sound data to create loop sound data of at least one bar, and store the loop sound data in the memory;
      repeatedly replay the loop sound data stored in the memory; and
      perform an operation to overlap sound data acquired during replaying of the loop sound data onto the loop sound data being replayed, and store the overlapping sound data in the memory.

2. The recording and playback device according to claim 1, wherein the controller is further configured to:
   set a recording time for the beat based on a specified tempo and the specified meter; and
   perform an operation to record inputted sound data in the memory from a time when sound data exceeding a threshold value is inputted until a time when the set recording time elapses.

3. A non-transitory computer-readable storage medium having stored thereon a program that is executable by a computer used in a musical sound playback device, the program being executable by the computer to perform functions comprising:
   storing in a memory first sound data having a length corresponding to a beat among sound data acquired from an external source;
   creating a plurality of pieces of copied sound data from the first sound data, such that a number of the created pieces of the copied sound data is based on a specified meter, connecting one of the plurality of pieces of copied sound data to another of the plurality of pieces of copied sound data to create loop sound data of at least one bar, and storing the loop sound data in the memory;
   repeatedly replaying the loop sound data stored in the memory; and
   performing an operation to overlap sound data acquired during replaying of the loop sound data onto the loop sound data being replayed, and storing the overlapping sound data in the memory.

4. A musical sound playback method comprising:
   storing in a memory first sound data having a length corresponding to a beat among sound data acquired from an external source;
   creating a plurality of pieces of copied sound data from the first sound data, such that a number of the created pieces of the copied sound data is based on a specified meter, connecting one of the plurality of pieces of copied sound data to another of the plurality of pieces of copied sound data to create loop sound data of at least one bar, and storing the loop sound data in the memory;
   repeatedly replaying the loop sound data stored in the memory; and
   performing an operation to overlap sound data acquired during replaying of the loop sound data onto the loop sound data being replayed, and storing the overlapping sound data in the memory.

5. The non-transitory computer-readable storage medium according to claim 3, the functions further comprising:
   setting a recording time for the beat based on a specified tempo and the specified meter; and
   performing an operation to record inputted sound data in the memory from a time when sound data exceeding a threshold value is inputted until a time when the set recording time elapses.

6. The method according to claim 4, further comprising:
   setting a recording time for the beat based on a specified tempo and the specified meter; and
   performing an operation to record inputted sound data in the memory from a time when sound data exceeding a threshold value is inputted until a time when the set recording time elapses.

7. The device according to claim 1, wherein the plurality of pieces of copied sound data are created such that the number of the created pieces of the copied sound data is equal to a number of beats in the specified meter.

8. The non-transitory computer-readable storage medium according to claim 3, wherein the plurality of pieces of copied sound data are created such that the number of the created pieces of the copied sound data is equal to a number of beats in the specified meter.

9. The method according to claim 4, wherein the plurality of pieces of copied sound data are created such that the number of the created pieces of the copied sound data is equal to a number of beats in the specified meter.

* * * * *

UNITED STATES PATENT AND TRADEMARK OFFICE
CERTIFICATE OF CORRECTION

PATENT NO. : 9,336,764 B2
APPLICATION NO. : 13/598216
DATED : May 10, 2016
INVENTOR(S) : Masaru Setoguchi It is certified that error appears in the above-identified patent and that said Letters Patent is hereby corrected as shown below:

In the specification,

Column 1, line 10 (approx.), change "137391" to --187351--.

Signed and Sealed this
Second Day of August, 2016

Michelle K. Lee
*Director of the United States Patent and Trademark Office*